United States Patent [19]

Brodmann et al.

[11] 4,139,357
[45] Feb. 13, 1979

[54] CHEMICAL DESIZING OF FIBER GLASS FABRIC

[75] Inventors: George L. Brodmann, Bath; Dudley K. Moses, Wadsworth, both of Ohio

[73] Assignee: PPG Industries, Inc., Pittsburgh, Pa.

[21] Appl. No.: 858,871

[22] Filed: Dec. 8, 1977

[51] Int. Cl.$^2$ .......................... C03C 25/00; B05D 1/38
[52] U.S. Cl. .......................................... 65/30 R; 65/2; 65/65; 134/2; 134/19; 427/381
[58] Field of Search .................... 65/2, 65, 3 R, 30 R; 134/2, 19; 427/381

[56] References Cited

U.S. PATENT DOCUMENTS

| | | | |
|---|---|---|---|
| 2,674,548 | 4/1954 | Balz | 134/2 |
| 3,019,140 | 1/1962 | Kilby et al. | 134/30 |
| 3,227,192 | 1/1966 | Griffiths | 139/420 |
| 3,762,897 | 10/1973 | Johnson | 65/3 R |
| 3,796,601 | 3/1974 | Kindron et al. | 134/2 |
| 3,990,908 | 11/1976 | Caropreso et al. | 134/2 |
| 4,045,601 | 8/1977 | Brodmann et al. | 427/381 |

*Primary Examiner*—Robert L. Lindsay, Jr.
*Attorney, Agent, or Firm*—Edward J. Whitfield

[57] ABSTRACT

Sized fiber glass fabric is cleaned and desized by contacting the sized fabric with an oxidizing agent under alkaline conditions followed by treatment with an organic solvent.

8 Claims, No Drawings

CHEMICAL DESIZING OF FIBER GLASS FABRIC

BACKGROUND OF THE INVENTION

Prior to weaving glass fibers into a fabric, the fibers are typically coated with a starch-oil size which protects the fibers from abrasion, binds them together and also serves as a lubricant during processing. The size is typically compounded of dextrinised or amylose starches, hydrogenated vegetable oils, waxes, emulsifiers, film formers and wetting agents, the precise composition varying depending on the manufacturer and processing conditions. Typical fiber glass size compositions and application techniques are disclosed, for example, in U.S. Pat. No. 3,227,192.

When the glass fabric is to be used as a reinforcing material in, for example, plastic laminates, by combining the fabric with thermosetting or thermoplastic resins, the fabric is typically first coated with a bonding material such as an organo-silane coupling agent which provides a stable bond between the glass and the resin. The presence of the size on the fiber used to weave the fabric prevents effective adhesion of the glass fabric with the coupling agent and consequently the size must be substantially completely removed from the fabric before the coupling agent is applied to the fabric.

Size is typically removed from glass fabric by heating the fabric at an elevted temperature for a time sufficient to burn-off the size. Typically, the glass fabric is subjected to from 72 to 96 hours of heat treatment at a temperature of about 800° F. to 900° F. Although the heat treatment is effective in removing the size, it is disadvantageous from the standpoints of both time and energy consumption. More importantly, such heat treatment results in a substantial reduction in tensile strength of the fabric. Although the loss in tensile strength is not particularly serious if the glass fabric is intended for use as a decorative material, for example, draperies and the like, the considerable loss in tensile strength is a definite disadvantage when the glass fabric is to be used as a reinforcing material in plastic laminates.

In addition, the woven fabric is typically spotted and smudged with machine oil and grease picked up from the weaving apparatus. During high temperature heat treatment, the oil and grease picked up by the fabric during the weaving operation is converted to hydrochloric acid which attacks and erodes the fabric, and studies have shown that as much as 5 percent of the fabric is thus rendered unsuitable for use.

Chemical desizing methods are also known and described, for example, in U.S. Pat. No. 3,990,908 and U.S. Pat. No. 3,019,140 which respectively disclose desizing by oxidation and solvent treatment.

SUMMARY OF THE INVENTION

Sized fiber glass fabric is chemically cleaned and desized by a process comprising treating the fabric with an aqueous alkaline solution containing an oxidizing agent followed by treatment with an organic solvent.

DESCRIPTION OF THE INVENTION

According to the invention, sized fiber glass fabric is contacted with an aqueous alkaline solution containing an oxidizing agent to break down and solubilize the starch component of the size. The fabric is rinsed with water to remove the solubilized starch, dried, and is then contacted with an organic solvent to remove the oil, wax and solvent-soluble components of the size as well as oil and grease picked up by the fabric during the weaving operation. The cleaned and desized fabric may then be coated with a coupling agent, for example, an organo-silane, to make the glass surface receptive to subsequent bonding with a thermoplastic or thermosetting resin.

In a typical practice of the invention, sized fiber glass fabric is wetted, preferably by padding at ambient temperaure, to a wet pick-up of from about 25 to 50 percent with an aqueous treating solution of hydrogen peroxide and ammonium hydroxide. The padded fabric is then heated, preferably by contacting with steam for from about 30 seconds to 5 minutes. The combination of heat from the steam and alkalinity from the ammonium hydroxide activates the hydrogen peroxide which oxidizes and solubilizes the starch component of the size. The padded fabric may be contacted with steam under atomspheric or super-atomspheric pressure conditions. Since, however, gaseous ammonia is generated during steam treatment, an unpressurized steam system is preferred for safety reasons.

The hydrogen peroxide content of the treating solution will vary depending on the size content of the fabric and the starch content of the size. Typically, the fabric contains about 1.5 to 3 percent by weight of size having a starch content of about 50 to 70 percent. A treating solution containing from about 1 to 10 percent by weight hydrogen peroxide and preferably between 3 and 8 percent will suffice for most purposes. Sufficient ammonium hydroxide is used to maintain the pH of the treating solution between 8.5 and 11.0 and preferably between 9.5 and 10.5. Ammonium hydroxide is typically present in amounts of from 0.3 to 3.0 percent by weight and preferably from about 0.5 to 2.0 percent by weight. Commercially available concentrated aqueous solutions of hydrogen peroxide and ammonium hydroxide may be used to prepare the treating solution. Alternatively, gaseous ammonia could be bubbled into the solution to prepare the ammonium hydroxide in situ. If desired, the treating solution may contain a wetting agent, for example, Triton X-100 ®, to enhance contact of the treating solution with the size. The amount of wetting agent used is typically in the range of about 0.025 to 0.5 percent by weight.

Although other oxidizing agents have been used, such as, for example, sodium perborate, potassium permanganate, diisoperphthalic acid, sodium carbonate peroxide, peroxydisulphate, peroxydiphosphate and the like, hydrogen peroxide is preferably used in the process of the invention since it is consumed in the process and does not deposit metallic or organic residues on the fabric. fabris. Chlorine containing oxidizing agents, such as hypochlorous acid, are to be avoided since chlorine will attack and decompose the glass.

For like reasons, ammonium hydroxide is preferably used as the source of alkalinity. Although alkali metal hydroxides and carbonates have been used, alkali metals such as sodium and potassium could have a corrosive effect on the glass.

As an alternative to padding and steam treating the fabric, the fabric may be immersed in a bath of the treating solution maintained at a temperature at or near the boiling point for a time sufficient to solubilize and break down the starch in the size, usually for about 1 to 3 minutes. This technique, however, requires considerably more volume of solution than that required for padding and moreover the treating bath tends to become contaminated with starch. In addition, energy consumption is increased since the treating bath should be maintained at a temperature at or near the boiling point whereas an ambient temperature treating solution is satisfactory for padding.

Following either immersion or padding plus steam treatment, the fabric is rinsed with water to remove the solubilized starch. Rinsing may be effected by immersing the fabric in water maintained at about 120° F. to 160° F. for a time sufficient to remove the solubilized starch, usually abot 10 to 15 seconds. Preferably, the fabric is given at least two such rinses to be sure that the solubilized starch is substantially removed. The rinsed, substantially starch-free fabric is preferably dried and then contacted with an organic solvent to remove the remaining size components, namely, oils, waxes and other solvent-soluble materials as well as oil and grease picked up by the fabric during the weaving operation. Drying of the fabric may be effected in any conventional manner such as passing the fabric through dry-cans or contacting the fabric with hot, i.e., about 220° F., air for about 30 seconds to 3 minutes, the extent of drying depending on the moisture stability of the solvent. The fabric is contacted at ambient temperature with the solvent for a time sufficient to remove the solvent-soluble constituents in the sizing. Usually a contact time of the fabric with solvent of between 15 seconds to one minute is satisfactory.

Any commonly used cleaning or degreasing solvent may be used in the practice of the invention, such as, for example, toluene, carbon tetrachloride, perchloroethylene, trichloroethylene, methylchoroform, 1,1,2-trichloroethane, and the like. The solvent should be substantially water immiscible and have a relatively low heat of vaporization. Chlorohydrocarbon solvents are preferred, particularly perchloroethylene since it is non-flammable and has good heat and moisture stability.

After solvent treatment, the fabric is dried to remove excess solvent and the cleaned, desized fabric may be further processed. In a preferred practice, the fabric, after contact with the solvent and prior to drying, is contacted at ambient temperature with a solvent solution of a coupling agent, for example, an organo-silane or siloxane, which treatment makes the glass surface receptive to subsequent bonding with thermosetting or thermoplastic resins. The solvent solution of the coupling agent should contain a small amount of water, usually about 0.1 to 0.5 percent by weight based on the weight of coupling agent in order to assure that the coupling agent is adequately hydrolyzed. The choice of coupling agent depends, of course, on the resin the glass fabric will be combined with, and a wide variety of coupling agents are commercially available and are specifically designed for use in specific resin systems. Sufficient coupling agent is usually used such that the treated fabric contains from about 0.1 to 0.5 percent by weight of coupling agent. Coupling agents suitable for use in the practice of the invntion are disclosed, for example, in U.S. Pat. No. 3,814,715.

The process of the invention may be carried out batchwise or continuously but is intended for continuous operation.

Alternatively, if desired, the processing steps may be reversed, i.e., the sized fiber glass fabric may first be solvent treated to remove oil, grease, and the solvent-soluble components of the size and then contacted with the aqueous alkaline treating solution to solubilize the starch components of the size followed by rinsing, drying, application of the coupling agent, and drying. This, however, would entail an additional trying step, i.e., after solvent treatment and prior to contact with the treating solution which would increase the overall energy requirement of the system. The invention is further illustrated by the following examples.

EXAMPLE 1

Sized fiber glass fabric (44 warp × 32 filling; warp tensile strength 285 pounds per inch as determined by ASTM D-579) containing 2.3 weight percent of a typical starch-oil size comprising 60 percent potato starch and the balance of soy bean oil, carbowax, and polyvinyl alcohol is padded to a wet pick-up of 35 percent with an aqueous solution containing 10 percent by weight hydrogen peroxide, 3 percent by weight ammonium hydroxide, and 0.1 percent by weight of Triton X-100 ® wetting agent. The padded fabric is passed through a flash steamer at a rate of 2 yards per minute and contacted with 212° F. steam for two minutes. The steamed fabric is passed through two successive wash boxs containing 140° F. water, the residence time in each wash box being about 10 seconds. The fabric is then passed, in about 30 seconds, through a series of four dry-cans maintained at a temperature of between 180° F. to 200° F. and thence through an ambient temperature perchloroethylene bath, the fabric being in contact with the perchloroethylene for about 30 seconds. The fabric is then contacted with a solution of about 0.3 percent by weight organo-silane (Dow Corning Z-6079) in perchloroethylene for about 5seconds and dried for about 2 minutes at a temperature of about 250° F. The fabric after processing has a residual size content of less than 0.1 percent by weight and a warp tensile strength of 145 pounds per inch as determined by ASTM D-579.

EXAMPLE 2

The procedure described in Example 1 is followed except that in place of padding and steaming, the sized fabric is immersed for about two minutes in a hot (i.e., about 210° F. to 212° F.) aqueous solution containing 3 percent by weight hydrogen peroxide, 1 percent by weight ammonium hydroxide, and 0.1 percent by weight Triton X-100 ® wetting agent. The fabric is then rinsed, dried, and solvent treated as described in Example 1. The fabric, after processing, has a residual size content of less than 0.1 percent by weight and a warp tensile strength of 165 pounds per inch as determined by ASTM D-579.

COMPARISON EXAMPLE 3

A sized fiber glass fabric as used in Example 1 is passed through an ambient temperature perchloroethylene bath, the fabric being in contact with the perchloroethylene for about 30 seconds. The fabric is then passed through two successive wash boxes containing 140° F. water, the residence time in each wash box being about 10 seconds. The fabric is then dried by passing the fabric in about 30 seconds through a series of four dry-cans maintained at a temperature of between 180° F. and 200° F. The fiber glass fabric, after processing, has a residual size content of 2.01 percent and a warp tensile strength of 207 pounds per inch as determined by ASTM D-579. The high tensile strength is attributable to the high residual size content of the fabric.

COMPARISON EXAMPLE 4

The procedure described in Example 1 is followed except that the solvent treatment is omitted. The fabric, after processing, has a residual size content of 0.35 percent by weight and a warp tensile strength of about 128 pounds per inch as determined by ASTM D-579.

COMPARISON EXAMPLE 5

A sized fiber glass fabric as used in Example 1 is placed in an oven and heat treated for 72 hours at a temperature of 850° F. The heat-treated fiber glass fabric, although having a residual size content of less than 0.1 percent by weight, has a warp tensile strength of only 48 pounds per inch as determined by ASTM D-579.

From the foregoing, it is seen that when sized fiber glass fabric is chemically desized or cleaned according to the invention, a fiber glass fabric having both a low residual size content as well as a considerably higher tensile strength is obtained as compared with fiber glass fabric subjected to solvent treatment alone, oxidation alone, or heat treatment.

Although the invention has been described with specific references and specific details of embodiments thereof, it is to be understood that it is not intended to be so limited since changes and alterations therein may be made by those skilled in the art which are within the full intended scope of this invention as defined by the appended claims.

We claim:

1. A process for chemically cleaning and desizing sized fiber glass fabric which process excludes high temperature heat treatment comprising the steps of:
   (a) wetting the sized fabric with an aqueous treating solution to solubilize the starch component of the size, said treating solution containing from about 1 to 10 percent by weight hydrogen peroxide and sufficient ammonium hydroxide to maintain the pH of the treating solution at between about 8.5 to 11.0;
   (b) rinsing the wetted fabric with water to remove the solubilized starch therefrom;
   (c) contacting the rinsed fabric with an organic cleaning solvent to remove water-insoluble components of the size as well as oil and grease picked up by the fabric during the weaving operation; and
   (d) drying the cleaned, substantially size-free fabric.

2. The process of claim 1 wherein the pH of the treating solution is from about 9.5 to 10.5.

3. The proces of claim 1 wherein the organic solvent is selected from the group consisting of toluene, carbon tetrachloride, perchloroethylene, trichloroethylene, methylchloroform, and 1,1,2-trichloroethane.

4. The process of claim 3 wherein the organic solvent is perchloroethylene.

5. The process of claim 1 wherein the fabric is wetted with the treating solution by padding at ambient temperature to a wet pick-up of from about 25 to 50 percent and then contacted with steam prior to rinsing.

6. The process of claim 1 wherein the fabric is wetted with the treating solution by immersion in a bath of treating solution maintained at or near its boiling point.

7. The process of claim 1 wherein the fabric is dried after rinsing and prior to contacting with the organic solvent.

8. The process of claim 1 wherein the fabric after contact with the organic solvent and prior to drying is coated with a coupling agent.